(12) United States Patent
Abu Asba et al.

(10) Patent No.: US 11,790,176 B2
(45) Date of Patent: Oct. 17, 2023

(54) SYSTEMS AND METHODS FOR A VIRTUAL AGENT IN A CLOUD COMPUTING ENVIRONMENT

(71) Applicant: ServiceNow, Inc., Santa Clara, CA (US)

(72) Inventors: Nabil Abu Asba, The Hague (NL); Mark David Griffin, Lakeside, CA (US); Anuj Jain, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 620 days.

(21) Appl. No.: 16/431,185

(22) Filed: Jun. 4, 2019

(65) Prior Publication Data

US 2020/0302020 A1    Sep. 24, 2020

Related U.S. Application Data

(60) Provisional application No. 62/820,736, filed on Mar. 19, 2019.

(51) Int. Cl.
*G06F 40/30* (2020.01)
*G10L 15/22* (2006.01)
(Continued)

(52) U.S. Cl.
CPC .......... *G06F 40/30* (2020.01); *G06F 40/295* (2020.01); *G10L 15/1822* (2013.01);
(Continued)

(58) Field of Classification Search
None
See application file for complete search history.

(56) References Cited

U.S. PATENT DOCUMENTS 6,609,122 B1    8/2003 Ensor
7,020,706 B2    3/2006 Cates
(Continued)

FOREIGN PATENT DOCUMENTS

JP    2009036998 A    2/2009
JP    2018185561 A    11/2018

OTHER PUBLICATIONS

U.S. Appl. No. 16/247,190, filed Jan. 14, 2019, Asba et al.
(Continued)

*Primary Examiner* — Richard Z Zhu
(74) *Attorney, Agent, or Firm* — Fletcher Yoder, PC

(57) ABSTRACT

Present embodiments are directed to a virtual agent with improved natural language understanding (NLU) capabilities. The disclosed virtual agent enables topic selection and topic changes during natural language exchanges with a user. The virtual agent is designed to select suitable topic flows to execute based on intents identified in received user utterances, including selection of an initial topic flow in response to a topic identified in a first user utterance, as well as switching between topic flows mid-conversation based on identified topic changes. The virtual agent is also capable of considering all intents and entities conveyed during the conversation, which enables the virtual agent to avoid prompting the user to provide redundant information. Furthermore, the virtual agent is capable of executing topic flows as part of a global topic flow, which enables the virtual agent to perform a number of predefined activities as part of each interaction with the user.

20 Claims, 10 Drawing Sheets

(51) Int. Cl.
  *H04L 51/02* (2022.01)
  *G06F 40/295* (2020.01)
  *G10L 15/18* (2013.01)
  *H04L 67/10* (2022.01)
  *G06F 40/35* (2020.01)
  *G06F 40/279* (2020.01)

(52) U.S. Cl.
  CPC .............. *G10L 15/22* (2013.01); *H04L 51/02*
  (2013.01); *G06F 40/279* (2020.01); *G06F*
  *40/35* (2020.01); *G10L 2015/223* (2013.01);
  *H04L 67/10* (2013.01)

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,683 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,633,004 B2 * | 4/2017 | Giuli | G06F 3/167 |
| 9,645,833 B2 | 5/2017 | Mueller | |
| 9,654,473 B2 | 5/2017 | Miller | |
| 9,679,300 B2 * | 6/2017 | Lynch | G06Q 30/0201 |
| 9,766,935 B2 | 9/2017 | Kelkar | |
| 9,792,387 B2 | 10/2017 | George | |
| 9,805,322 B2 | 10/2017 | Kelkar | |
| 9,922,642 B2 * | 3/2018 | Pitschel | G10L 15/063 |
| 10,657,961 B2 * | 5/2020 | Cash | G06F 16/9537 |
| 11,238,850 B2 * | 2/2022 | Mukherjee | G06Q 30/0641 |
| 2005/0105712 A1 * | 5/2005 | Williams | H04M 3/5166 |
| | | | 379/265.02 |
| 2013/0268260 A1 | 10/2013 | Lundberg et al. | |
| 2014/0278413 A1 | 9/2014 | Pitschel et al. | |
| 2015/0348549 A1 * | 12/2015 | Giuli | G10L 15/1822 |
| | | | 704/235 |
| 2015/0348565 A1 * | 12/2015 | Rhoten | G06F 16/243 |
| | | | 704/270.1 |
| 2016/0042735 A1 * | 2/2016 | Vibbert | G10L 15/222 |
| | | | 704/257 |
| 2017/0046124 A1 * | 2/2017 | Nostrant | G10L 15/16 |
| 2018/0189267 A1 | 7/2018 | Takiel | |

OTHER PUBLICATIONS

U.S. Appl. No. 16/255,671, filed Jan. 23, 2019, Asba et al.
U.S. Appl. No. 62/820,730, filed Mar. 19, 2019, Asba et al.
International Search Report and Written Opinion for PCT Application No. PCT/US2020/023682 dated Jul. 3, 2020; 10 pgs.
Japanese Patent Application for Japanese Patent Application No. 2021-556537 dated Feb. 7, 2023; 6 pgs.

* cited by examiner

SYSTEMS AND METHODS FOR A VIRTUAL AGENT IN A CLOUD COMPUTING ENVIRONMENT

CROSS-REFERENCE TO RELATED APPLICATIONS

This application claims priority from and the benefit of U.S. Provisional Application Ser. No. 62/820,736, entitled "SYSTEMS AND METHODS FOR A VIRTUAL AGENT IN A CLOUD COMPUTING ENVIRONMENT", filed Mar. 19, 2019, which is hereby incorporated by reference in its entirety for all purposes.

BACKGROUND

The present disclosure relates generally to natural language understanding (NLU), and more specifically to a NLU virtual agent for a cloud computing environment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

Certain simple virtual agents may process natural language requests on a keyword basis. For example, certain virtual agents are designed as decision trees that include predefined instructions and responses to certain user utterances. For example, such a virtual agent may identify a keyword in a natural language request from a user in a chat dialog, and may respond to the request by repeatedly prompting the user to provide additional details regarding the request until a sufficient amount of information is collected for the virtual agent to take action. By way of specific example, upon receiving a request from a user to update his address information, a simple virtual agent may identify that the user generally intends to update his information based on one or more keywords. In response, the simple virtual agent may present the user with a series of prompts (e.g., dialogs with options for the user to interact with using a keyboard and mouse) that enable the user to indicate which piece of information should be updated, as well as to provide the new address details. Accordingly, in certain situations, these simple virtual agents may prompt the user to provide information that was previously provided as part of the initial natural language request. Additionally, such simple virtual agents may not be suited to identifying topics or topic changes in the natural language request. As such, it is presently recognized that it is desirable to improve the operation of virtual agents to reduce inefficiencies and to improve the overall user experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a virtual agent with improved natural language understanding (NLU) capabilities. The disclosed virtual agent enables topic selection and topic changes during natural language exchanges with a user. More specifically, the disclosed virtual agent is designed to select suitable topic flows to execute based on intents identified in received user utterances. This can include, for example, the selection of an initial topic flow in response to a topic identified in a first user utterance, as well as switching between topic flows mid-conversation based on identified topic changes. Additionally, when switching from a first topic flow to a second topic flow mid-conversation, the virtual agent determines whether the first topic flow will be resumed upon completion of the second topic flow. The disclosed virtual agent is also capable of considering all intents and entities conveyed by the user in natural language utterances during the conversation, which enables the virtual agent to avoid prompting the user to provide redundant information. Furthermore, the virtual agent is capable of executing topic flows as part of a global topic flow, which enables the virtual agent to perform a number of predefined activities as part of each interaction with the user, providing a more standardized experience. As such, the disclosed virtual agent improves the performance and usability of the virtual agent, which improves the overall experience of the user when interacting with the virtual agent.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
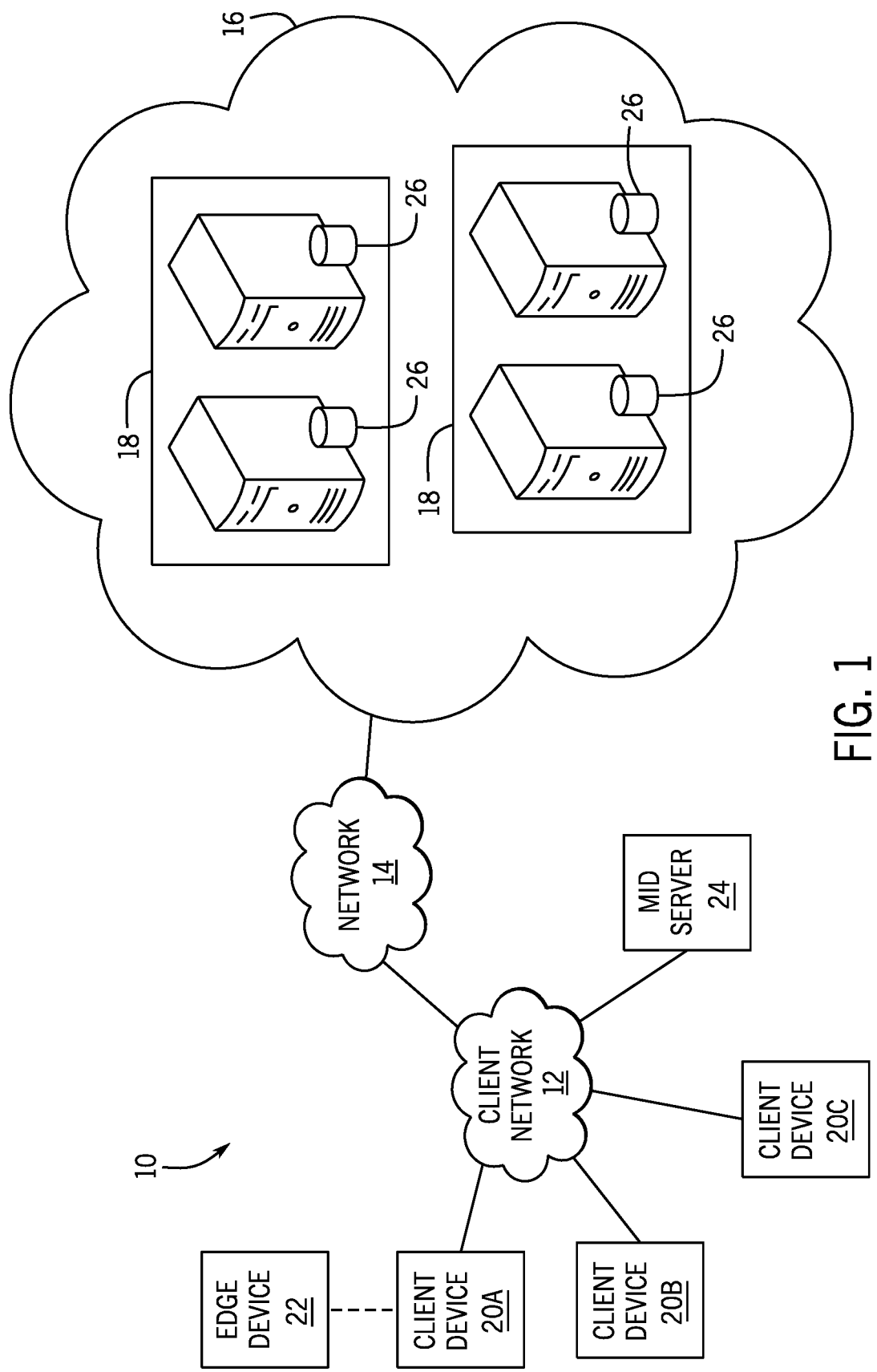
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, flows, threads and/or a set of computing instructions executed by a computing system. Example embodiments of an application include software modules, software objects, software instances and/or other types of executable code.

As used herein, a "flow" refers to a set of actions or instructions (e.g., a portion of an application) that is executed to achieve a particular effect. Flows may be presented in a graphical form in which actions or groups of actions are represented by nodes (e.g., user input nodes, script nodes, decision nodes) in a flow diagram. As used herein, a "topic flow" refers to a flow that is designed to perform one or more actions to address a particular topic or intent of the user. As used herein, an "utterance" refers to a string of natural language text received from a user. As used herein, a "conversation" refers to an exchange of natural language requests and responses between a user and a virtual agent via a particular conversational medium (e.g., chat rooms, email, forum posts, and so forth). A non-limiting list of example utterances include, chat entries, email subjects, incident descriptions, and so forth. As used herein, an "intent" refers to something indicated in an utterance that a user wants to achieve or accomplish. As used herein, an "entity" refers to something in an utterance that is the subject, object, and/or the context for an intent. As used herein, a "virtual agent" refers to an application that is configured to receive and suitably respond to user utterances based on the intents and entities identified in user utterances.

Present embodiments are directed to a virtual agent with improved natural language understanding (NLU) capabilities. The disclosed virtual agent enables topic selection and topic changes during natural language conversations with a user. More specifically, the disclosed virtual agent is designed to select suitable topic flows to execute based on intents identified in received user utterances. Additionally, when switching from a first topic flow to a second topic flow mid-conversation, the virtual agent determines whether the first topic flow is resumed upon completion of the second topic flow. Furthermore, the disclosed virtual agent is capable of storing and applying all intents conveyed by the user in natural language requests during the conversation with the virtual agent, which enables the virtual agent to avoid prompting the user to provide redundant information. Additionally, the disclosed virtual agent supports the creation and execution of a global topic flow, which can enable all interactions with the virtual agent to follow a predefined and customizable pattern. As such, the disclosed virtual agent improves the performance and usability of the virtual agent, which improves the overall experience of the user.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
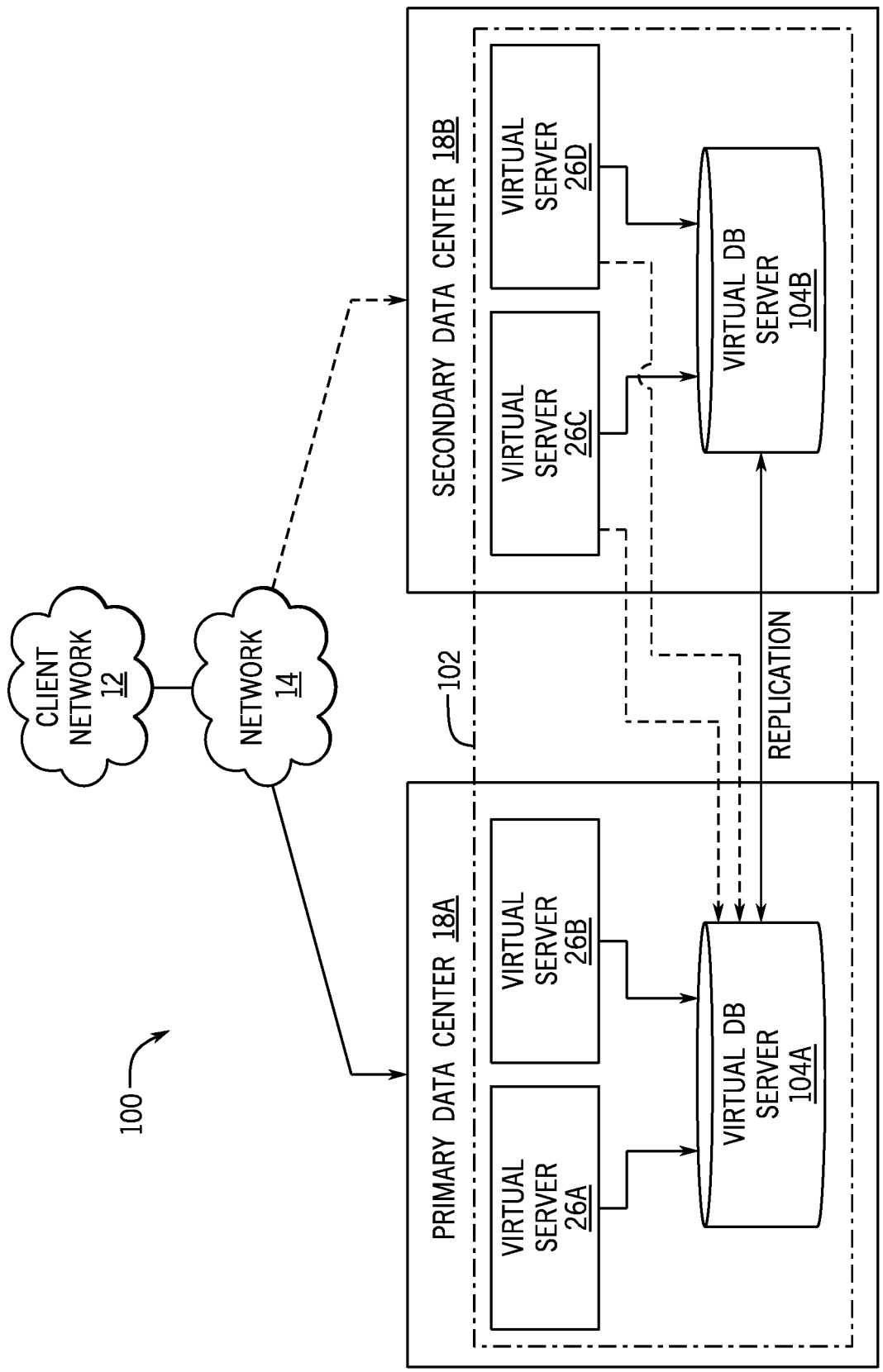
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
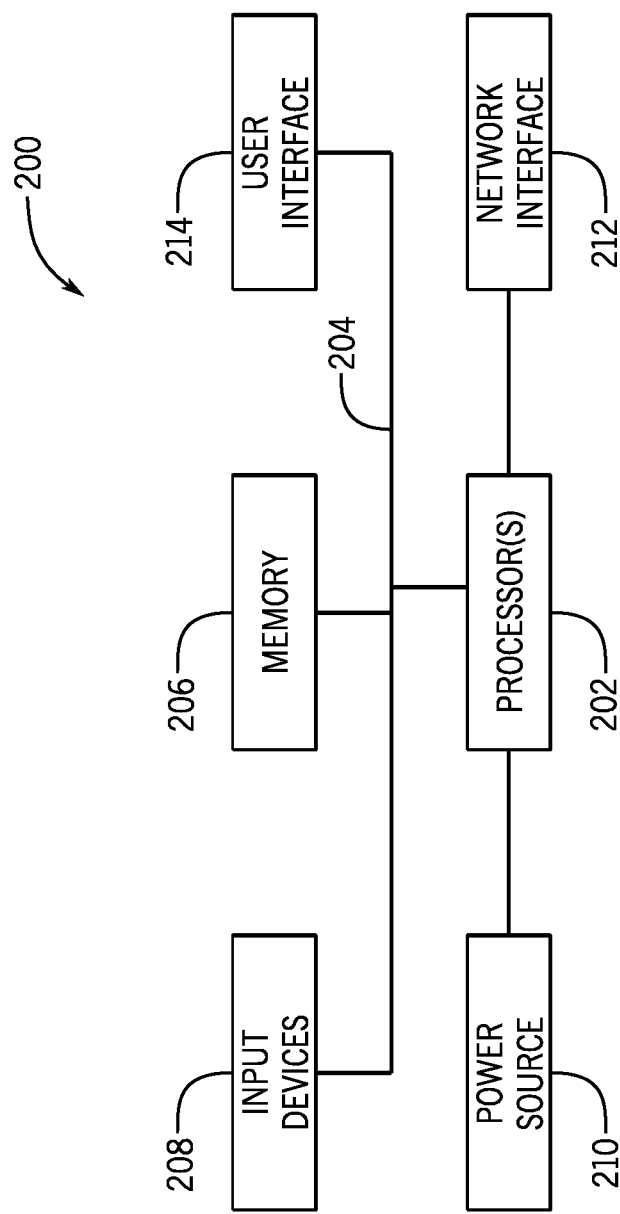
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
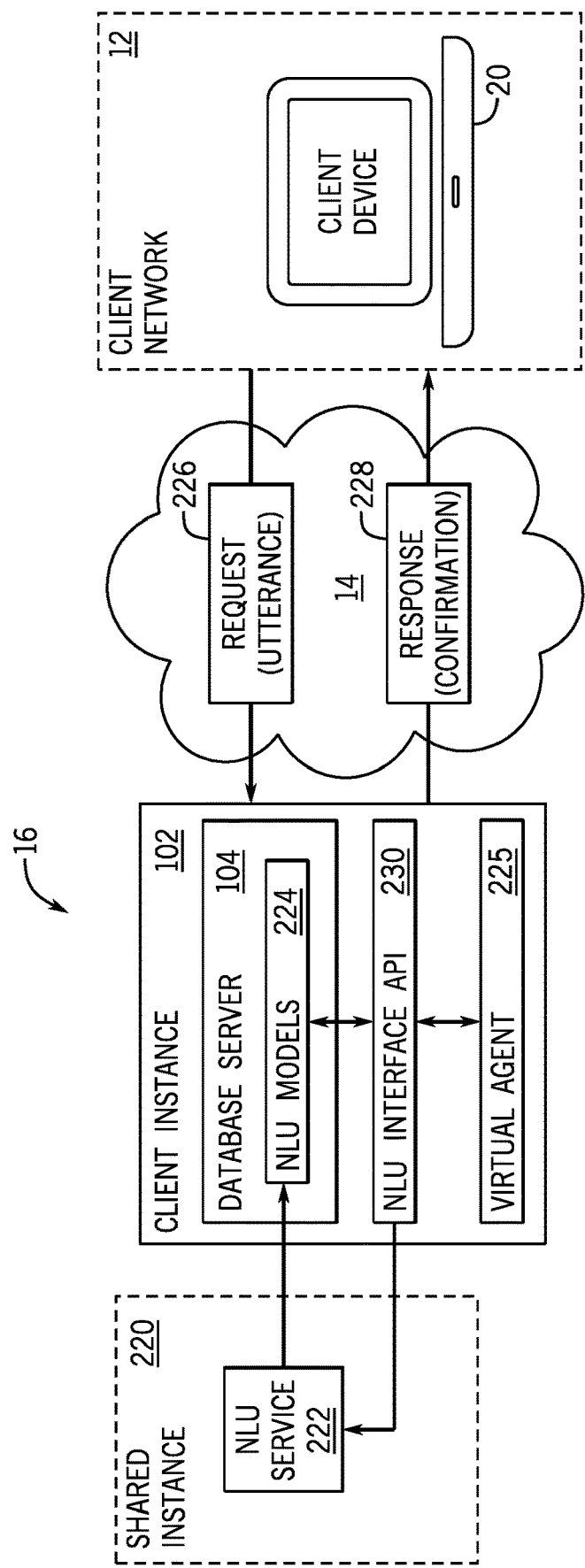
FIG. 4 is a block diagram of a portion of an embodiment of a service provider cloud infrastructure that includes a virtual agent, in accordance with aspects of the present disclosure.

FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

For the illustrated embodiment, the client instance 102 is communicatively coupled to a shared instance 220 of the cloud-based platform 16. The shared instance 220 hosts a NLU service 222 that can be used by any suitable number of client instances to provide NLU functionality. For example, in certain embodiments, the NLU service 222 is capable of analyzing a collection or corpus of utterances (e.g., chat sessions, email exchanges, forum posts, and so forth) stored by the database server 104 of the client instance 102 to generate one or more NLU models 224, which may also be referred to herein as intent/entity models. In other embodiments, the NLU models 224 may be manually created by a developer or designer. As used herein, a "NLU model" is a collection of intents and entities that are defined alongside sample utterances of these intents and entities. In certain embodiments, these NLU models 224 may be stored by a database server 104 of the client instance 102, as illustrated in FIG. 4. It may be appreciated that, in other embodiments, the NLU service 222 may be an external service that is communicatively coupled to the client instance 102 via the network 14.

For the embodiment illustrated in FIG. 4, the client instance 102 includes a virtual agent 225 that is designed to receive a natural language request as an utterance 226 from a user of the client device 20 and to respond accordingly. In certain cases, the response of the virtual agent 225 may include performing actions within the client instance 102 and/or providing a response 228 or confirmation message to the user of the client device 20. The utterance 226 and/or response 228 may be in the form of a written natural language request, such as a chat messages, email messages, forum posts, and so forth. Additionally, the client instance 102 includes a NLU interface application programming interface (API) 230 that enables the virtual agent 225 to provide the received utterance 226 and NLU models 224 to the NLU service 222 for processing. Upon receipt, the NLU service 222 searches the NLU models 224 for intents and entities indicated in the utterance 226 based on the sample utterances stored in the NLU models 224. Then, the NLU service 222 provides a scored set (e.g., a list or table) of intents and entities identified in the utterance 226 to the virtual agent 225, wherein the scored set of intents and entities includes corresponding confidence scores for each of the identified intents and/or entities. As discussed below, the virtual agent 225 is designed to execute particular topic flows in response to certain intents and/or entities being identified in the user utterance 226 at different points in the conversation.

Figure 5:
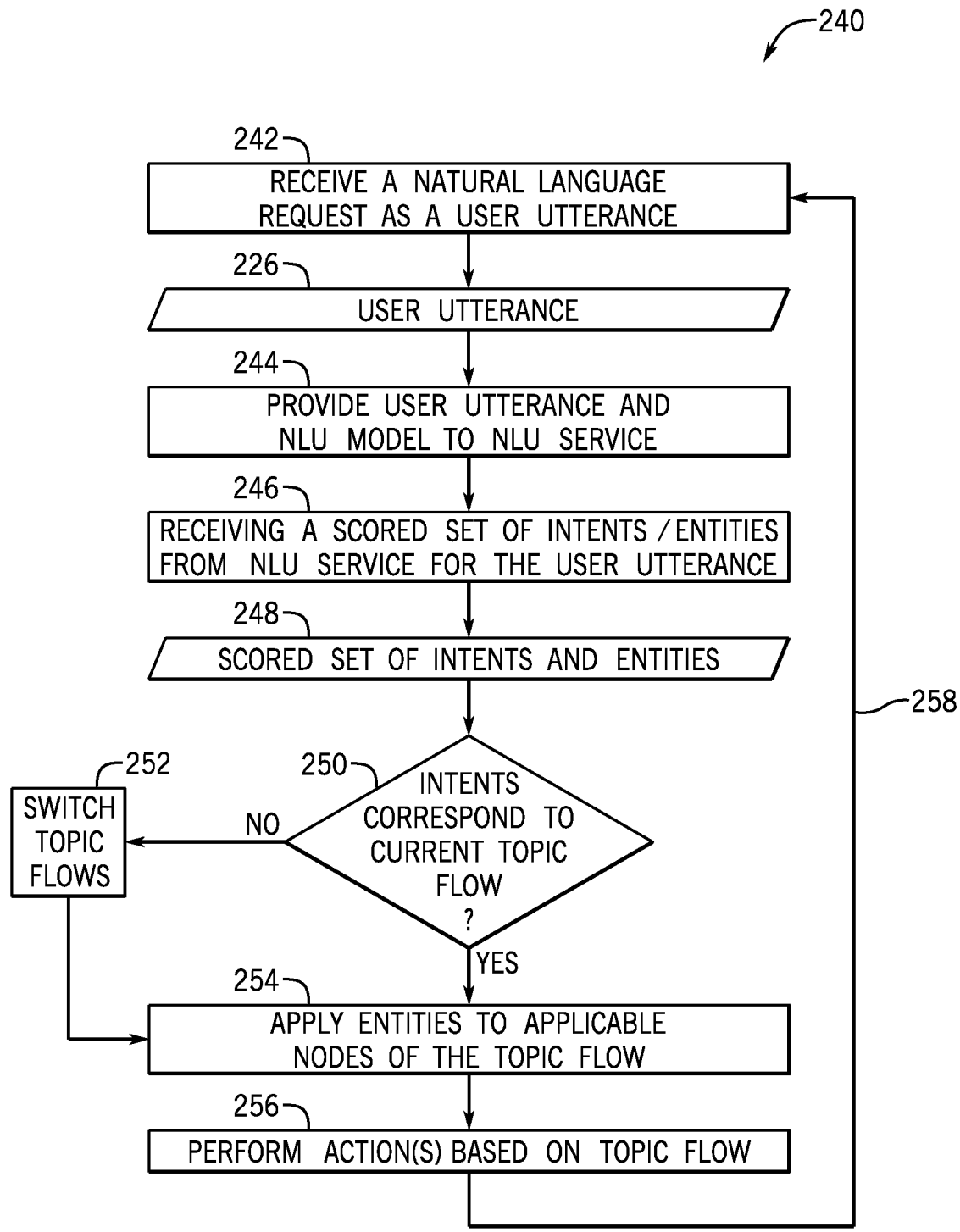
FIG. 5 is a flow diagram illustrating an embodiment of a process by which the virtual agent receives and responds to natural language utterances of a user, in accordance with aspects of the present disclosure.

FIG. 5 is a flow diagram illustrating an embodiment of a process 240 by which the virtual agent 225 receives and responds to natural language utterances of a user. As such, the process 240 may be stored in at least one suitable memory (e.g., memory 206) and executed by at least one suitable processor (e.g., processor 202) associated with the cloud-based platform 16. It may be appreciated that, in other embodiments, the process 240 may include additional steps, omitted steps, repeated steps, and so forth, in accordance with the present disclosure. Additionally, the process 240 of FIG. 5 is discussed with reference to elements of FIG. 4.

The embodiment of the process 240 illustrated in FIG. 5 begins with the virtual agent 225 receiving (block 242) a natural language request as a user utterance 226. For example, the virtual agent 225 may be a chat virtual agent, and the received user utterance 226 may be a chat message from a user of the client device 20. In response, the virtual agent provides (block 244) the user utterance 226 and one or more of the NLU models 224 to the NLU service 222 for processing, wherein the NLU service 222 identifies and scores intent and entities of the user utterance 226 based on the NLU models 224. Subsequently, the virtual agent receives (block 246) the scored set of intents and entities 248 from the NLU service 222 for the user utterance 226.

Once the virtual agent 225 receives the scored set of intents and entities 248, the virtual agent 225 determines (block 250) whether the identified intents correspond to a current topic flow of the virtual agent 225. For example, a virtual agent 225 may include a topic flow for ordering products, a topic flow for checking the status of orders, a topic flow for updating user account information, and so forth. As such, each topic flow is associated with a particular intent defined in the NLU models 224. When the virtual agent 225 determines that an intent of the received set of scored intents and entities does not correspond to a currently executing topic flow, then the virtual agent 225 responds by switching (block 252) to and executing another topic flow. In particular, the virtual agent 225 identifies another topic flow that is associated with an intent of the received set of scored intents and entities 248, and begins execution of this topic flow. As discussed below, depending on the design of the topic flow, the virtual agent 225 may or may not resume execution of the original topic flow at the conclusion of the new topic flow.

For the embodiment illustrated in FIG. 5, the process 240 continues with the virtual agent 225 applying (block 254) entities from the scored set of intents and entities 248 to the selected topic flow. That is, rather than prompting the user for information that was already provided as part of the utterance 226 or previous utterances of the conversation, the virtual agent 225 applies this entity data to various data input nodes of the topic flow. For example, if an initial user utterance includes a statement, "I would like to order a pepperoni pizza," then the virtual agent 225 may identify an intent to order food in decision block 250, and switch to an "Order pizza" topic flow in block 252. The "Order pizza" topic flow may include a number of data input nodes designed to collect information from the user regarding the type of pizza, the type of pizza crust, toppings to be included, and so forth. However, since the user utterance 226 already included an entity indicating a desire for pepperoni toppings, this entity is applied to the corresponding input nodes of the "Order pizza" flow. As such, when the virtual agent 225 is executing the "Order pizza" topic flow, the virtual agent 225 will not prompt the user to repeat aspects of the order when these input nodes are reached, and will only prompt the user to provide data for input nodes that have not yet been satisfied, such as asking about the type of pizza or the type of crust. Additionally, in certain embodiments, the virtual agent 225 may additionally store the entity data from previously received user utterances (e.g., user utterances that are part of the same conversation). For such embodiments, the virtual agent 225 may also apply this entity data from the previously received user utterances to the selected topic flow to avoid requesting information already received from the user.

For the embodiment illustrated in FIG. 5, the process 240 continues with the virtual agent 225 performing (block 256) one or more actions based on the current topic flow. For example, after applying entities from the received user utterance 226, the topic flow may execute as designed to address the request indicated in the user utterance 226. In certain cases, the virtual agent 225 may respond by performing actions within the client instance 102, such as creating, updating, or deleting records stored by the database server 104, executing other defined flows or scripts, communicating with external services, and so forth. In certain cases, the virtual agent 225 may additionally or alternatively provide the response 228 or confirmation message to the client device 20D indicating that that the user utterance 226 was received and/or that certain actions were performed. In certain cases, the virtual agent 225 may respond by prompting the user to provide additional data for input blocks that were not satisfied by the entities from the received user utterance 226. As indicated by the arrow 258, in certain embodiments, the virtual agent 225 may subsequently receive another utterance from the user and repeat the process 240.

Figure 6:
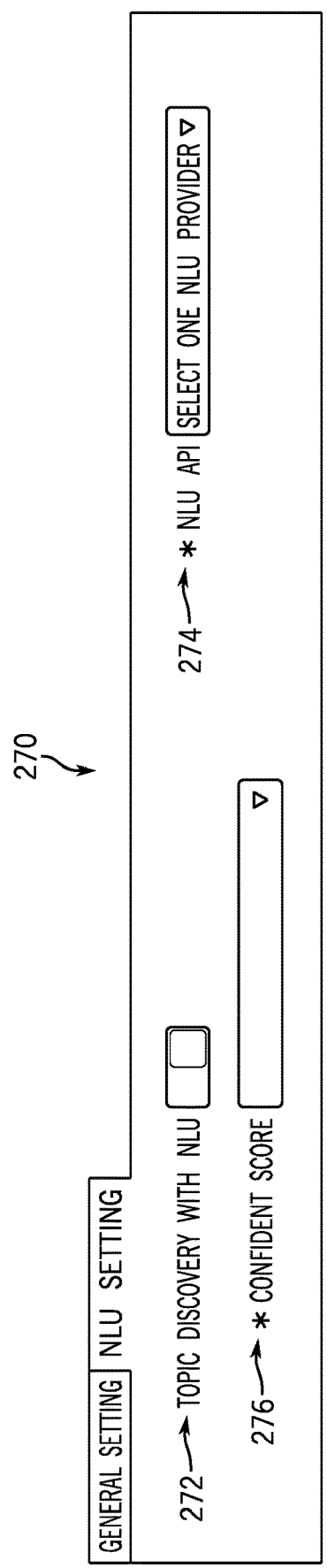
FIG. 6 is a simulated screenshot of an embodiment of a graphical user interface (GUI) that is used to configure NLU topic discovery for the virtual agent, in accordance with aspects of the present disclosure.

FIG. 6 is a simulated screenshot of an embodiment of a graphical user interface (GUI) 270 that is used to configure NLU topic discovery for the virtual agent 225. It may be appreciated that the GUI 270, as well as other GUIs discussed below, may be hosted by the client instance 102 and accessed via a web browser application of the client device 20D. Additionally, it may be noted that the data received and presented by the GUI 270, as well as other GUIs discussed below, may be stored in one or more suitable database tables (e.g., a NLU_Settings table, a Topic_Properties table, a Topic_Flow table, a Global_Topic_Flow table, etc.) of the database server 104.

The GUI 270 illustrated in FIG. 6 includes a "Topic discovery with NLU" switch or checkbox 272. In certain embodiments, when the switch 272 is not selected or activated, then the virtual agent 225 performs topic discovery on a keyword basis, as discussed above. However, when the switch 272 is selected or activated, then the virtual agent 225 is configured to process user utterances using an embodiment of the process 240 of FIG. 5. The illustrated GUI 270 also includes a "NLU API" dropdown list 274 that is designed to receive and present a developer selection of a NLU provider from a predefined list of different NLU providers (e.g., PARLO, IBM WATSON, AMAZON ALEXA). As such, the NLU provider indicated by the dropdown list 274 will be provided received user utterances, along with one or more NLU models 224, in order to generate the scored set of intents and entities 248, as discussed above. The illustrated GUI 270 also includes a "Confident score" field 276 that is designed to receive and present a real number value between zero and one that represents the confidence threshold value for topic identification. That is, only when a confidence score of an intent in the scored set of intents and entities 248 is above the confidence threshold value, will the virtual agent 225 switch to executing the topic flow associated with this intent.

Figure 7:
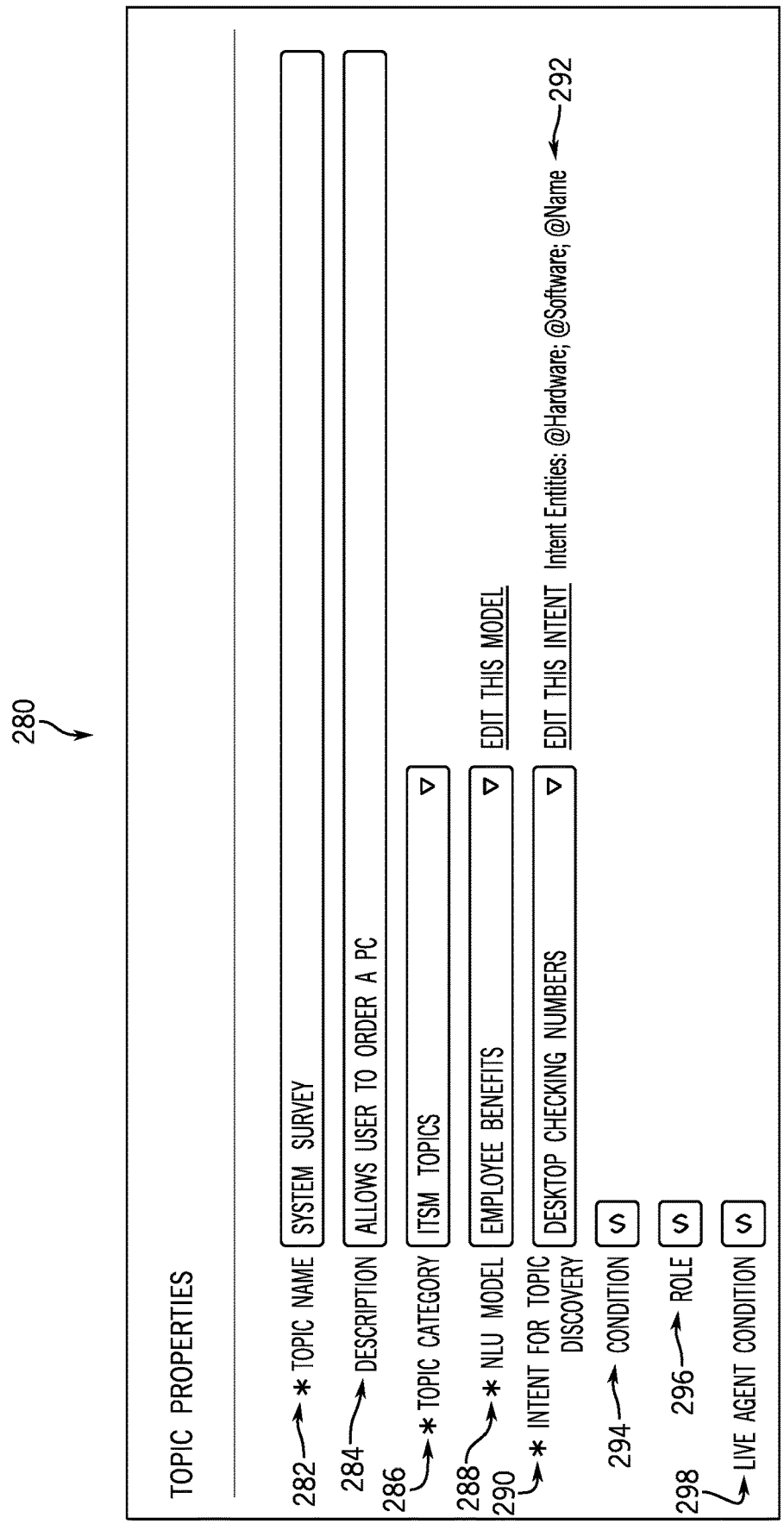
FIG. 7 is a simulated screenshot of an embodiment of a GUI that is used to configure a topic flow of the virtual agent, in accordance with aspects of the present disclosure.

FIG. 7 is a simulated screenshot of an embodiment of a GUI 280 that is used to configure a topic flow of the virtual agent 225. The illustrated GUI 280 includes a "Topic Name" field 282 designed to receive and present a string value that corresponds the topic name, as well as a "Description" field 284 designed to receive and present a string value that corresponds the topic description of the topic flow. The illustrated GUI 280 includes a "Topic Category" dropdown list 286 that is designed to receive and present a developer selection of a category of the topic flow from a predefined list of potential categories (e.g., a human resources category, a computer support category, and so forth) for the topic flow being configured. The illustrated GUI 280 includes a "NLU model" dropdown list 288 that is designed to receive and present a NLU model selection from a predefined list of available NLU models 224 (e.g., IT topics, Human Resources topics, Product Order topics, etc.) to be used by the NLU service 222 to process user utterances within the topic flow. The illustrated GUI 280 includes an "Intent for topic discovery" dropdown list 290 that is designed to receive and present a selected intent from a predefined list of intents that are defined within the selected NLU model, as indicated by the dropdown list 288. Additionally, the illustrated GUI 280 includes a text label 292 indicating the entities that are defined associated with the selected intent within the selected NLU model.

In certain embodiments, the GUI 280 of FIG. 7 may include additional elements that enable a designer to further control the execution of the topic flow. For example, the illustrated GUI 280 includes a "Condition" button 294 that enables the designer to establish a predefined set of conditions that are to be met before the topic flow can be executed. The illustrated GUI 280 includes a "Role" button 296 that enables the designer to identify particular roles or user accounts of the client instance 102 that are authorized to provoke execution of the topic flow. Additionally, the illustrated GUI 280 includes a "Live Agent Condition" button 298 that enables the designer to define conditions (e.g., the receipt of certain intents and/or entities) during the execution of the topic flow that, when met, prompts the virtual agent 225 to hand off the conversation to a live agent. In other embodiments, the GUI 280 may also include a "Resume Topic Flow If Switched" checkbox that is designed to receive and present a Boolean value indicating whether the virtual agent 225 will return and resume execution of the topic flow when the virtual agent 225 switches to a different topic flow mid-conversation.

Figure 8:
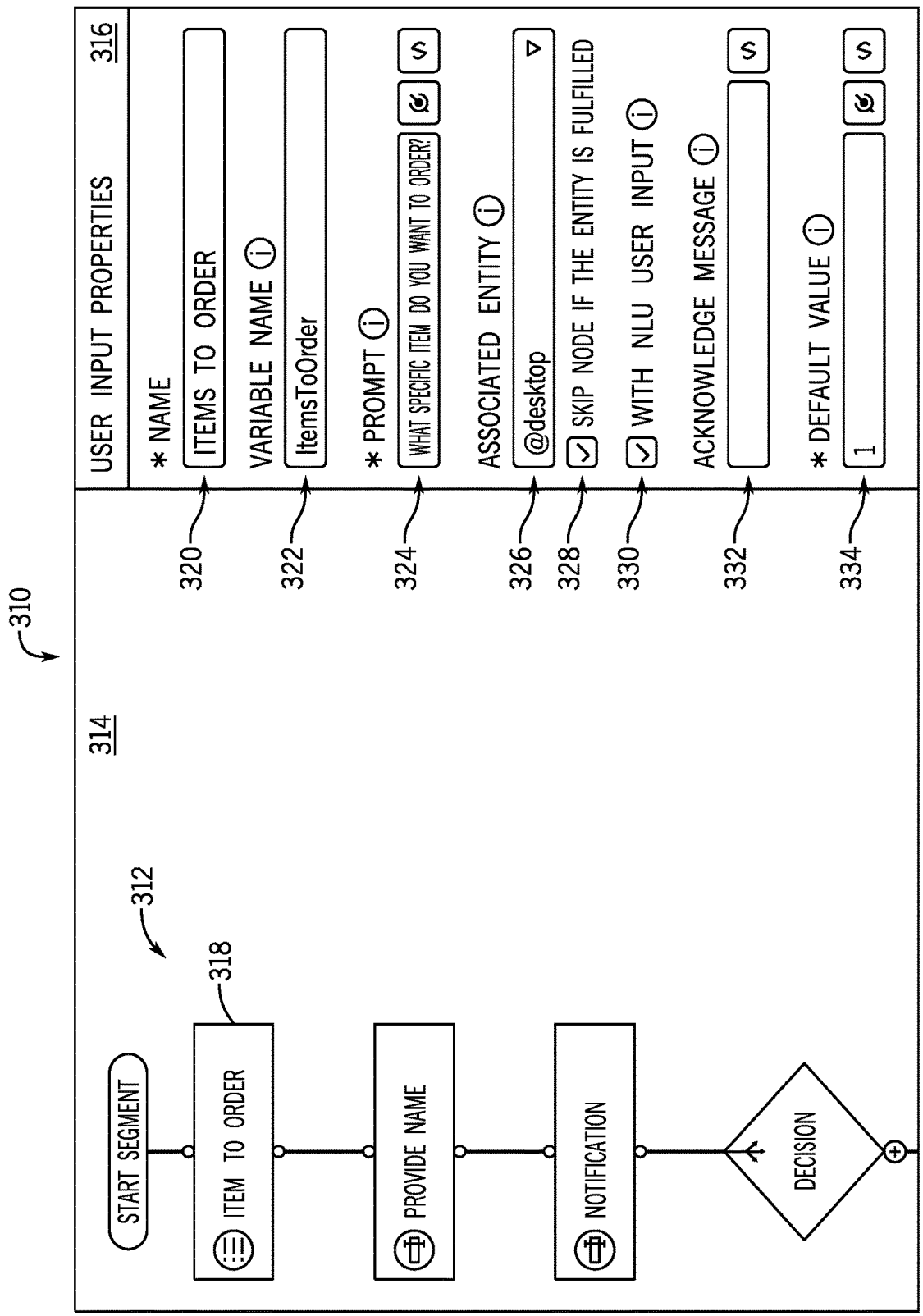
FIG. 8 is a simulated screenshot of an embodiment of a GUI that is used to design a topic flow of the virtual agent, in accordance with aspects of the present disclosure.

FIG. 8 is a simulated screenshot of an embodiment of a GUI 310 that is used to design a topic flow 312 of the virtual agent 225. The illustrated GUI 280 includes a flow section 314 that visually depicts a portion of the example topic flow 282. The illustrated GUI 310 also includes a properties section 316 that lists properties of a selected node in the flow section 312 of the GUI 310. The illustrated portion of the example topic flow 312 includes a currently selected user input node "Items to Order" 318, and as such, the properties for this element are presented in the properties section 316 of the GUI 310.

For the illustrated embodiment, the properties section 316 of the GUI 310 includes a "Name" field 320 that is designed to receive and present a string value that represents a name of the topic flow. The properties section 316 of the illustrated GUI 310 also includes a "Variable Name" field 322 designed to receive and present a string value that defines the name of a variable within the topic flow that is assigned a value in response to data input from the user. The properties section 316 of the illustrated GUI 310 includes a "Prompt" field 324 designed to receive and present a string value that defines the text that the virtual agent 225 may provide to the user to request the information associated with the user input node. It may be appreciated that certain prompts may be questions that are presented to the user to provoke a natural language response from the user, while other prompts may include user interface elements (e.g., buttons, checkboxes, drop down lists, etc.) that receive input from the user (e.g., via a mouse, keyboard, touchscreen, etc.).

For the illustrated embodiment, the properties section 316 of the GUI 310 includes an "Associated Entity" dropdown list 326 designed to receive and present a designer selection from entities that are defined in the NLU model associated with the topic flow, as discussed above with respect to FIG. 7. The properties section 316 of the illustrated GUI 310 also includes a "Skip node if the entity is fulfilled" checkbox 328 that is designed to receive and present a Boolean value (e.g., selected, unselected) indicating whether or not the entity selected in dropdown list 326 should be applied to populate the selected user input node 318 when the entity has been identified in a user utterance 226. As such, when the checkbox 328 is selected and the @desktop entity is identified within a previously received user utterance, the topic flow 312 will apply this entity value as the input data to the input node 318, and then proceed to execute the next node in the topic flow. When the "Skip node if the entity is fulfilled" checkbox 328 is not selected, or when it is selected and the @desktop entity is not defined within a previously received user utterance, then the input node will prompt the user for the data of the user input node based on the value indicated by the "Prompt" field 324.

For the illustrated embodiment, the properties section 316 of the GUI 310 includes a "With NLU User Input" checkbox 330 designed to receive and present a Boolean value (e.g., selected, unselected) indicating whether or not the virtual agent 225 will allow the user to respond to the prompt using a natural language utterance. For example, when this checkbox 330 is selected and the associated entity is not identified in a previously received utterance, then the virtual agent 225 prompts the user with the value indicated by the "Prompt" field 324, and enables the user to respond by providing a natural language utterance. When this element is not selected and the associated entity is not provided in a previously received utterance, then the virtual agent 225 provides the user with the text indicated by the "Prompt" field 324, and provides user interface elements (e.g., buttons, checkboxes, dropdown lists) with which the user can interact to respond to the prompt.

For the embodiment illustrated in FIG. 8, the properties section 316 of the GUI 310 includes an "Acknowledge Message" field 332 designed to receive and present a string value representing a message that the virtual agent 225 will send to the user in response to successfully receiving the user input data from the user. For the illustrated embodiment, the properties section 316 of the GUI 310 includes a "Default Value" field 334 designed to receive and present a default value that the virtual agent 225 assigns to the "ItemsToOrder" variable indicated in field 322 when the data is not received from the prompted user. In other embodiments, the properties section 316 of the GUI 310 includes a "Confirmation Message" field designed to receive and present a string value representing a message that the virtual agent 225 sends to the user to confirm the input provided by the user in response to the entity associated with the user input node 318 having a corresponding confidence score that is below a defined confidence threshold value.

Figure 9:
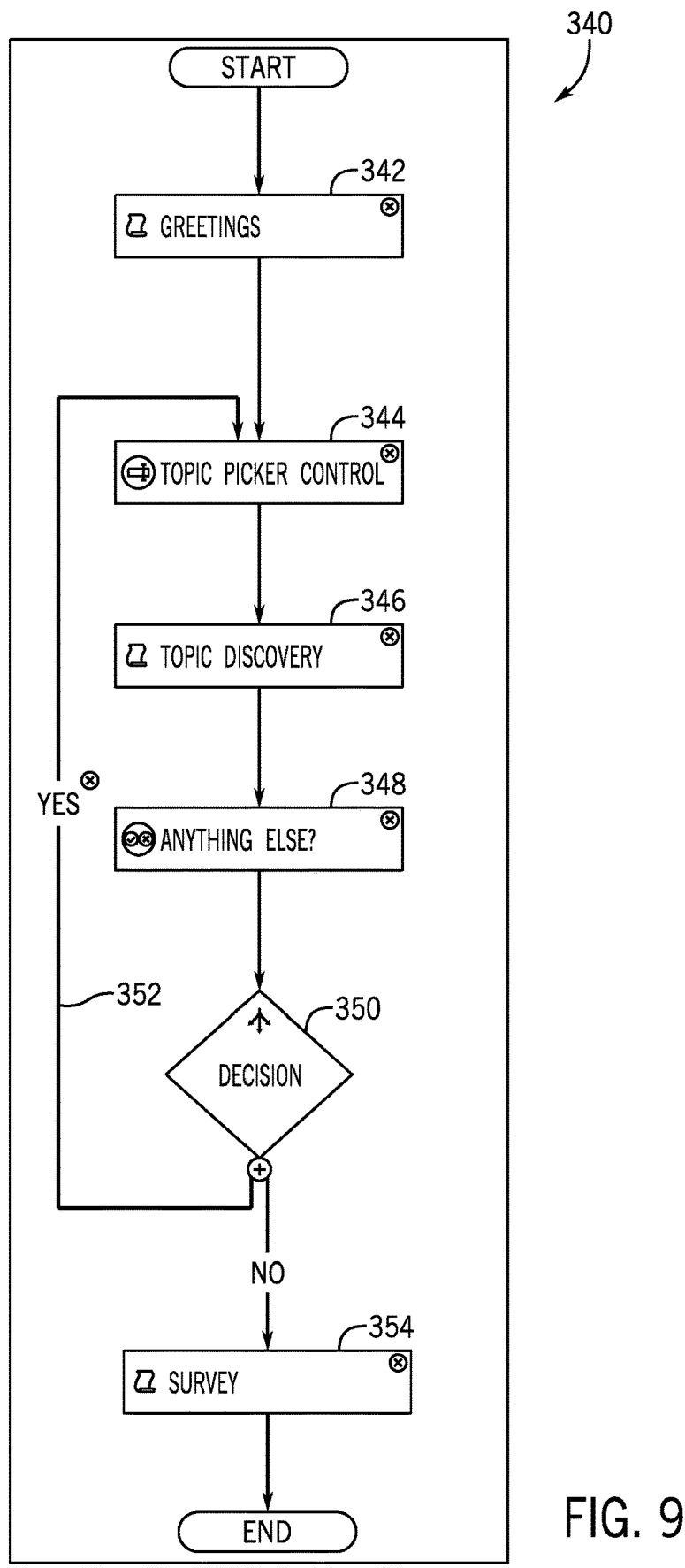
FIG. 9 is a block diagram of an embodiment of a global topic flow that is executed by the virtual agent, in accordance with aspects of the present disclosure.

Additionally, in certain embodiments, the virtual agent 225 may include a global topic flow that defines a set of steps to be performed by the virtual agent 225 as part of the execution of all topic flows. For example, FIG. 9 is a block diagram of an embodiment of a global topic flow 340 that is executed by the virtual agent 225. The illustrated global topic flow 340 defines certain activities that will occur for every natural language exchange that the virtual agent 225 has with a user, such that the overall conversational structure can be standardized and uniform across all user interactions with the virtual agent 225. Additionally, the global topic flow 340 provides a centralized flow that can be adjusted by a developer to modify the conversational structure and the behavior of the virtual agent 225 for all conversations.

For the embodiment illustrated in FIG. 9, the global topic flow 340 begins with a "Greetings" output node 342 that is configured to output a greeting to the user. A developer can customize the output of this node, such that all conversations with the virtual agent 225 begin with the same suitable greeting message. For example, the developer may configure the "Greetings" output node 342 to output a message, such as, "Hi @user name, I see you have @task_count tasks listed for today. How can I help you?"

The illustrated embodiment of the global topic flow 340 continues with a "Topic Picker Control" user input node 344 that is configured to receive a user utterance in response to the greeting message. After receiving the user utterance, the illustrated embodiment of the global topic flow 340 includes a "Topic Discovery" script node 346 that is configured to identify and execute suitable topic flows based on the received user utterance. That is, as discussed above with respect to FIG. 5, the virtual agent 225 receives the user utterance, provides the user utterance to the NLU service 222 for processing, and receives the score set of intents and entities 248 from the NLU service 222. Then, the virtual agent 225 attempts to identify a topic flow to execute based on a suitably high-confidence intent of the set of scored intents and entities 248 that is associated with the topic flow, as discussed above with respect to FIG. 7. When the virtual agent 225 successfully identifies an associated topic flow, the virtual agent 225 switches to and begins execution of the identified topic flow. As such, it may be appreciated that the "Topic Discovery" script node 346 handles topic discovery, topic switching, and topic flow execution, as discussed above with respect to FIG. 5. As such, in certain embodiments, the "Topic Discovery" script node 346 may include instructions that define how topic switching should commence, such as whether the original topic flow is resumed after completion of the switched topic flow. In certain embodiments, the "Topic Discovery" script node 346 also includes instructions that prompt the virtual agent 225 to execute an error topic flow in the event that the scored set of intents and entities 248 does not include a suitably high-confidence intent that is associated with a particular topic flow. In certain embodiments, the "Topic Discovery" script node 346 also handles switching to a live agent topic flow that routes the user utterance to a live agent to resume interactions with the user, such as in the event that a live agent is requested by the user.

Upon completion of the execution of one or more topic flows, the illustrated embodiment of the global topic flow 340 continues with an "Anything else?" user input node 348 (also referred to herein as an additional topics input node) configured to prompt the user and receive input (e.g., a natural language utterance) indicating whether or not the user would like to address another topic. As with the other prompts for user input discussed above, in certain embodiments, the prompt may be a question that presented to the user to provoke a natural language response from the user (e.g., "Do you have any other requests?"), while other prompts may include user interface elements (e.g., a "Yes" button and a "No" button) that receive non-natural language input from the user (e.g., via a mouse, keyboard, touchscreen, etc.).

The virtual agent 225 processes the response of the user and continues to a decision node 350, wherein the virtual agent 225 determines whether the received user input indicates additional topics to be discussed. When the user response received at the node 348 is indicative of additional topics to be discussed, the virtual agent 225 returns to the "Topic Picker Control" user input node 344, as indicated by the arrow 352. For embodiments in which the user response is a natural language utterance, the virtual agent 225 may use the NLU service 222 to process the user utterance, as discussed above, to identify a suitably high-confidence intent that is associated with particular topic flows. As such, for these embodiments, the virtual agent 225 may apply the identified intent to the "Topic Picker Control" user input node 344 and proceed to the "Topic Discovery" script node 346, rather than prompting the user for additional topics to discuss.

For the embodiment of the global topic flow 340 illustrated in FIG. 9, when the virtual agent 225 determines, at the decision node 350, that the user has no further topics to be discussed, the virtual agent 225 may proceed to a "Survey" script node 354 configured to prompt the user with one or more questions about the user's experience using the virtual agent 225. The "Survey" script node 354 is further configured to receive user input in response to the prompt, and to store the user's response for review by the developer during continued development of the system. For the illustrated embodiment, after completing execution of the "Survey" script node 354, the virtual agent 225 concludes execution of the global topic flow 340.

Figure 10:
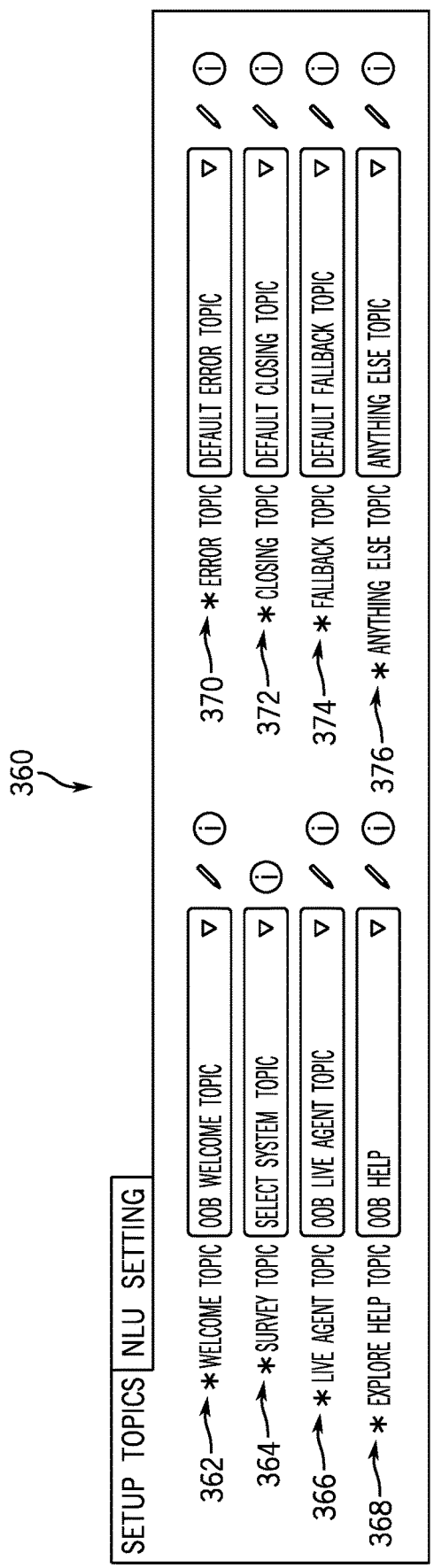
FIG. 10 is a simulated screenshot of an embodiment of a GUI that is used to design the global topic flow of the virtual agent, in accordance with aspects of the present disclosure.

FIG. 10 is a simulated screenshot of an embodiment of a GUI 360 that is used to design a global topic flow (e.g., the global topic flow 340 of FIG. 9) for the virtual agent 225. It may be appreciated that the GUI 360 is merely an example, and in other embodiments, the GUI 360 may include additional fields or fewer fields, in accordance with the present disclosure. The illustrated GUI 360 includes a "Welcome topic" dropdown menu 362 that is designed to receive and present a developer selection of a topic flow to be executed at the beginning of the global topic flow, such as by the "Greetings" output node 342 of the global topic flow 340 illustrated in FIG. 9. The illustrated GUI 360 includes a "Survey topic" dropdown menu 364 is designed to receive and present a developer selection of a topic flow to be executed at the end of the global topic flow, such as by the "Survey" script node 354 illustrated in FIG. 9.

Additionally, the GUI 360 illustrated in FIG. 10 includes additional fields for defining additional topic flows to be executed in response to different conditions during execution of the global topic flow. For example, the illustrated GUI 360 includes a "Live Agent topic" dropdown menu 366 that is designed to receive and present a developer selection of a topic flow that is executed in response to the user requesting to interact with a live agent during execution of the global topic flow. The "Explore help topic" dropdown menu 368 is designed to receive and present a developer selection of a topic flow that is executed in response to the user requesting help regarding how to interact with the virtual agent 225. The "Error Topic" dropdown menu 370 is designed to receive and present a developer selection of a topic flow that is executed in response to an error being encountered while executing the global topic flow. The "Closing topic" dropdown menu 372 is designed to receive and present a developer selection of a topic flow that may be executed prior to the topic flow indicated by the "Survey topic" dropdown menu 354. The "Fallback topic" dropdown menu 374 is designed to receive and present a developer selection of a topic flow that may be executed when the virtual agent 225 is unable to identify a corresponding topic flow in response to a user utterance. The "Anything else" dropdown menu 376 is designed to receive and present a developer selection of a topic flow that may be executed as part of the "Anything else?" user input node 348 to determine whether the user has additional requests to process.

The technical effects of the present disclosure include a virtual agent with improved natural language understanding (NLU) capabilities. The disclosed virtual agent enables topic selection and topic changes during natural language conversations with a user. More specifically, the disclosed virtual agent is designed to select suitable topic flows to execute based on intents identified in received user utterances. Furthermore, the disclosed virtual agent is capable of storing and applying all intents conveyed by the user in natural language requests during the conversation with the virtual agent, which enables the virtual agent to avoid prompting the user to provide redundant information. Additionally, the disclosed virtual agent supports the creation and execution of a global topic flow, which can enable all interactions with the virtual agent to follow a predefined and customizable pattern. As such, the disclosed virtual agent improves the performance and usability of the virtual agent, which improves the overall experience of the user.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical.

The invention claimed is:

1. A method of operating a virtual agent, comprising:
executing a global topic flow that defines a series of nodes having instructions that are executed for each natural language exchange between the virtual agent and a plurality of users, wherein executing the global topic flow comprises:
executing a greetings node of the global topic flow that outputs a predefined greeting; and then
executing a topic discovery node of the global topic flow, wherein executing the topic discovery node comprises:
receiving a user utterance,
providing the user utterance to a natural language understanding (NLU) service,
receiving, from the NLU service, a scored set of intents and entities derived from the user utterance,
selecting a topic flow in response to determining that an intent from the scored set of intents and entities is associated with the topic flow,
applying entities from the scored set of intents and entities to input nodes of the topic flow, and
executing the topic flow to respond to the user utterance; and then
executing an additional topic node of the global topic flow that outputs a predefined prompt regarding additional topics to be discussed and receives input in response to the predefined prompt; and then executing a decision node of the global topic flow that repeats execution of the topic discovery node based on the input received in response to the predefined prompt.

2. The method of claim 1, wherein executing the topic discovery node of the global topic flow comprises:
receiving a second user utterance during execution of the topic flow;
providing the second user utterance to the NLU service;
receiving, from the NLU service, a second scored set of intents and entities derived from the second user utterance;
selecting a second topic flow in response to determining that a second intent from the second scored set of intents and entities is associated with the second topic flow;
applying entities from the scored set of intents and entities, or the second scored set of intents and entities, or a combination thereof, to data input nodes of the second topic flow; and
executing the second topic flow to respond to the second user utterance.

3. The method of claim 2, wherein the topic discovery node of the global topic flow is configured to resume execution of the topic flow after completing execution of the second topic flow.

4. The method of claim 1, wherein the input is a second user utterance, and comprising:
providing the second user utterance to the NLU service;
receiving, from the NLU service, a second scored set of intents and entities derived from the second user utterance; and
identifying the additional topics to be discussed based on the second scored set of intents and entities derived from the second user utterance.

5. The method of claim 1, wherein the predefined prompt includes user interface elements, and wherein receiving the input comprises receiving the input based on user interactions with the user interface elements of the predefined prompt.

6. The method of claim 1, wherein executing the global topic flow comprises:
after executing the decision node, executing a survey node of the global topic flow to output a predefined survey question and to receive and store a second user input in response to the predefined survey question.

7. The method of claim 1, comprising:
prior to executing the global topic flow, receiving settings of the global topic flow and configuring the global topic flow based on the received settings.

8. The method of claim 7, wherein the received settings indicate a greetings flow to be performed during execution of the greetings node of the global topic flow, wherein the greetings flow defines the predefined greeting.

9. The method of claim 7, wherein the received settings indicate an additional topics flow to be performed during execution of the additional topics node of the global topic flow, wherein the additional topics flow defines the predefined prompt.

10. The method of claim 7, wherein the received settings indicate an error flow to be performed in response to an error occurring during execution of the global topic flow.

11. The method of claim 1, wherein selecting the topic flow during execution of the topic discovery flow comprises:
selecting a live agent topic flow in response to determining that the scored set of intents and entities corresponds to a request to interact with a live agent.

12. The method of claim 1, wherein selecting the topic flow during execution of the topic discovery flow comprises:
selecting an explore help topic flow in response to determining that the scored set of intents and entities corresponds to a request for assistance in interacting with the virtual agent.

13. The method of claim 1, wherein executing the topic discovery node comprises:
selecting a fallback topic flow as the topic flow in response to determining that the scored set of intents and entities is not associated with a particular topic flow.

14. A virtual agent system, comprising:
at least one memory configured to store a global topic flow that defines a series of nodes having instructions that are executed for each natural language exchange between the virtual agent system and a plurality of users, wherein the series of nodes comprises a greetings node, followed by a topic discovery node, followed by an additional topic node, followed by a decision node;
at least one processor configured to execute the global topic flow to cause the virtual agent system to perform actions comprising:
executing the greetings node, wherein the greetings node is configured to output a predefined greeting to a user;
executing the topic discovery node, wherein the topic discovery node is configured to:
receive a user utterance from the user,
provide the user utterance to a natural language understanding (NLU) service,
receive, from the NLU service, a scored set of intents and entities derived from the user utterance,
select a topic flow in response to determining that an intent from the scored set of intents and entities is associated with the topic flow,
apply entities from the scored set of intents and entities to input nodes of the topic flow, and
execute the topic flow to respond to the user utterance; and
executing the additional topic node, wherein the additional topic node is configured to output a predefined prompt to the user regarding additional topics and to receive input from the user in response to the predefined prompt; and
executing the decision node, wherein the decision node is configured to repeat execution of the topic discovery node based on the input received from the user in response to the predefined prompt.

15. The system of claim 14, wherein the series of nodes includes a survey node that is executed after the decision node in the global topic flow, wherein the survey node is configured to output a predefined survey question to the user and to receive and store a second user input in response to the predefined survey question.

16. The system of claim 14, wherein executing the topic discovery node comprises:
determining a role of the user from which the user utterance was received; and
executing the topic flow in response to determining that the role of the user is authorized to execute the topic flow.

17. A non-transitory, computer-readable medium storing instructions executable by a processor of a computing system, the instructions comprising instructions to:
execute a global topic flow that defines a series of nodes having instructions that are executed for each natural language exchange between a virtual agent and a plurality of users, wherein the global topic flow comprises instructions to:
execute a greetings node of the global topic flow, wherein the greetings node comprises instructions that output a predefined greeting; and then
execute a topic discovery node of the global topic flow, wherein the topic discovery node comprises instructions to:
receive a user utterance from a user,
provide the user utterance to a natural language understanding (NLU) service,
receive, from the NLU service, a scored set of intents and entities derived from the user utterance,
select a topic flow in response to determining that an intent from the scored set of intents and entities is associated with the topic flow,
apply entities from the scored set of intents and entities to input nodes of the topic flow, and
execute the topic flow to respond to the user utterance; and then
execute an additional topic node of the global topic flow, wherein the additional topic node comprises instructions that output a predefined prompt regarding additional topics to be discussed and that receive input in response to the predefined prompt; and then
execute a decision node of the global topic flow, wherein the decision node comprises instructions that repeat execution of the topic discovery node based on the input received in response to the predefined prompt.

18. The medium of claim 17, wherein the topic discovery node comprises instructions to:
receive a second user utterance during execution of the topic flow;
provide the second user utterance to the NLU service;
receive, from the NLU service, a second scored set of intents and entities derived from the second user utterance;
select a second topic flow in response to determining that a second intent from the second scored set of intents and entities is associated with the second topic flow;
apply entities from the scored set of intents and entities, or the second scored set of intents and entities, or a combination thereof, to data input nodes of the second topic flow; and
execute the second topic flow to respond to the second user utterance.

19. The medium of claim 18, wherein the topic discovery node comprises instructions to:
resume execution of the topic flow after completing execution of the second topic flow.

20. The medium of claim 17, wherein the global topic flow comprises instructions to:
execute a survey node of the global topic flow after executing the decision node, wherein the survey node comprises instructions to:
output a predefined survey question to the user; and
receive and store a second input from the user in response to the predefined survey question.

* * * * *